L. M. POTTS.
ROLLER CLUTCH.
APPLICATION FILED APR. 9, 1919.
1,356,557.
Patented Oct. 26, 1920.
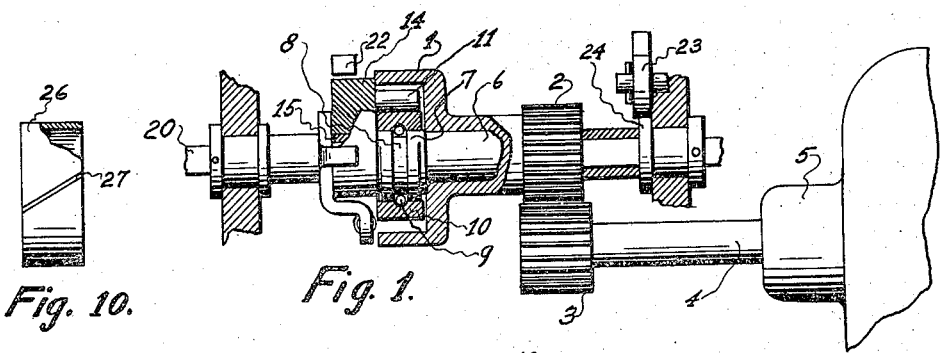
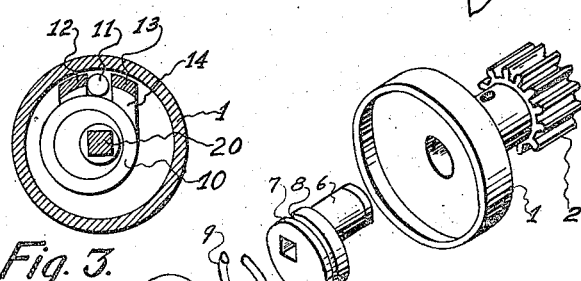
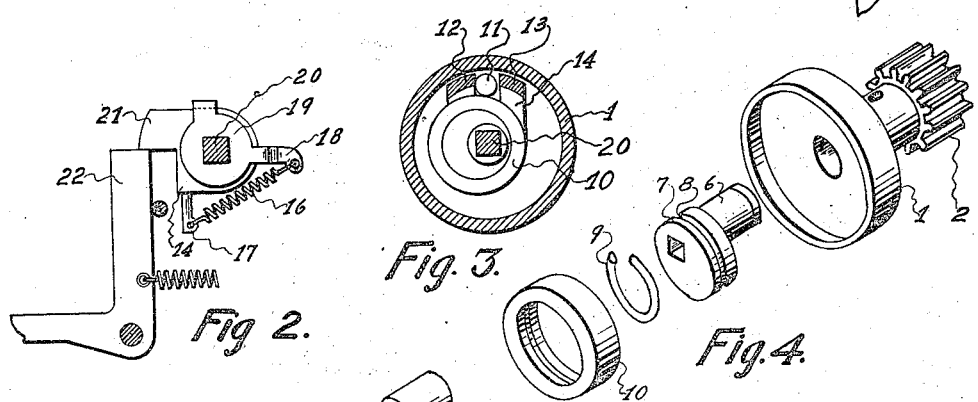
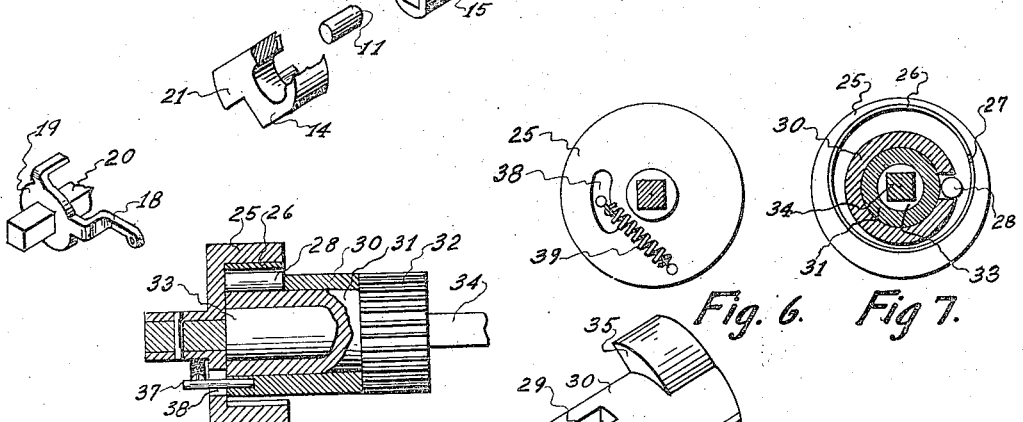
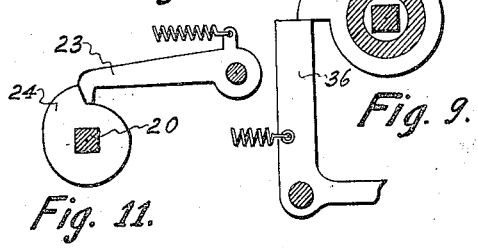
INVENTOR.
Louis M. Potts
BY
L. A. Stanley
ATTORNEY.

UNITED STATES PATENT OFFICE.

LOUIS M. POTTS, OF BALTIMORE, MARYLAND, ASSIGNOR, BY MESNE ASSIGNMENTS, TO AMERICAN TELEPHONE AND TELEGRAPH COMPANY, OF NEW YORK, N. Y., A CORPORATION OF NEW YORK.

ROLLER-CLUTCH.

1,356,557. Specification of Letters Patent. Patented Oct. 26, 1920.

Application filed April 9, 1919. Serial No. 288,843.

*To all whom it may concern:*

Be it known that I, LOUIS M. POTTS, a citizen of the United States, residing at Baltimore, State of Maryland, have invented certain new and useful Improvements in Roller-Clutches, of which the following is a specification.

This patent relates to improvements in that class of clutches known as roller clutches. In many automatic devices it is necessary to have shafts make a single revolution and yet have the driving motor rotate continuously. The clutch here described is particularly adapted to such use. It is extremely durable because there are no teeth or lugs to be broken or worn by use. It picks up in a very short distance and also releases with a very small amount of motion. The clutch is very suitable for high speeds of operation and is designed with special reference to durability and ease of manufacture.

My said invention will be described by reference to the following figures:

Figure 1 is a view partly in section of the clutch and the driving motor.

Fig. 2 shows the clutch stop mechanism.

Fig. 3 is a section showing the eccentric and roller.

Fig. 4 shows the various parts of the clutch in perspective, and arranged to show their method of assembling.

Fig. 5 shows another form of the clutch of simpler construction and better adapted to commercial manufacture.

Fig. 6 shows the spring attachment for the roller carrier of the clutch shown in Fig. 5.

Fig. 7 is a section showing the eccentric and roller of the clutch in Fig. 5.

Fig. 8 is a perspective view of the roller carrier of the clutch shown in Fig. 5.

Fig. 9 is the stop mechanism for the clutch shown in Fig. 5.

Fig. 10 shows the friction ring for clutch shown in Fig. 5.

Fig. 11 shows the correcting device.

The clutch comprises a constantly rotating drum 1 to which is rigidly fast gear 2. Gear 2 meshes with pinion 3 on shaft 4 of motor 5. Drum 1 rotates on a round sleeve 6 which carries on its end an eccentric shoulder 7. Eccentric shoulder 7 has in its circumference a groove 8 into which fits a single turn of spring wire 9. Mounted on eccentric shoulder 7 and held in place by the friction of spring 9 is a hardened steel ring 10. Between the inside of drum 1 and the outer surface of ring 10 is locking roller 11 which is carried between two prongs 12 and 13 on roller carrier 14 (see Fig. 3). Roller carrier 14 is mounted for rotation on a round sleeve 15. Roller carrier 14 is under tension of a spring 16 (see Fig. 2), one end of which is fast to spring post 17, in roller carrier 14, and the other end to a lug 18, on disk 19, which is fast to shaft 20. The tension of spring 16 is in such a direction as to tend to carry the roller 11 into the narrower portion of the space between drum 1 and eccentric ring 10. In the stopping position of shaft 20, lug 21 on roller carrier 14 engages an arm 22, and at the same time a correcting arm 23 (see Fig. 11) engages a sloping face on cam 24, rigidly attached to shaft 20 in such a way as to hold roller 11 in the wide portion of the space between drum 1 and eccentric ring 10 so that drum 1 may rotate freely. If arm 22 is disengaged from lug 21, spring 16 will move roller carrier 14 in such a way as to move roller 11 into the narrower portion of the space between drum 1 and eccentric ring 10 and lock drum 1 to eccentric ring 10 and thus cause shaft 20 to rotate until lug 21 again engages arm 22 and roller 11 is moved into the wider portion of the space between drum 1 and eccentric ring 10, and at the same time correcting arm 23 engages the sloping face of cam 24 and thereby has a tendency to move the shaft 20 farther forward than the power carries it and thereby fully releases the clutch and prevents chattering. If arm 23 and cam 24 were not provided, when the clutch starts to release, the roller 11 starts to unlock the concentric and eccentric members so that unless the shaft and parts attached thereto have sufficient momentum to throw the shaft farther, the clutch may partially release so that it has not sufficient power to move the shaft farther. This condition is prevented by the action of arm 23 and cam 24. Pawl 23 is under sufficient spring tension to move shaft 20 when pawl 23 engages the sloping face of cam 24. Arm 23 and cam 24 also prevent shaft 20 from moving backward due to the tension of spring 16 or due to jarring of the machine. The function of the loose ring 10 is to present a new bearing surface for roller 11 at frequent intervals. If ring 10 were solid with eccentric 7, roller 11 would eventually wear a flat on ring 10 and allow the clutch to slip. However, as constructed, each time the clutch picks up roller 11 acts as an intermediate gear and tends to move ring 10 backward. The friction, however, provided by spring 9 limits the amount the ring will rotate backward and causes ring 10 to move backward a small distance each time the clutch picks up and at the same time causes shaft 20 to be positively rotated forward.

The clutch shown in Figs. 5, 6, 7, 8 and 9 is similar in its operation to the clutch just described, but is somewhat simpler to construct. In this case the rotating drum 25 has an eccentric inner face which is lined with a hardened steel ring 26 which is split at point 27 in a diagonal line and is so made that it has a tendency to spring outward and thus create friction with drum 25. Split ring 26 performs the same function as ring 10 and spring 9 in Fig. 1. Ring 26 can slip with respect to eccentric drum 25 so as to present a different face for each successive engagement, and the split feature produces the necessary tension to prevent the ring from rotating continuously backward whenever engaged. Roller 28 is carried in a slot 29 in a round sleeve 30 which rotates on the round hub 31 of gear 32, which in turn is free to rotate on round sleeve 33 which is mounted on shaft 34 to which is rigidly attached drum 25. Roller carrier 30 carries a lug 35 adapted to engage stop arm 36. The other end of roller carrier 30 carries a spring post 37 which protrudes through a slot 38 in the face of drum 25 and has attached to it a spring 39, the other end of which is attached to a spring post in the face of drum 25. The tension of spring 39 is in such a direction as to tend to move roller 28 into the narrower portion of the space between eccentric ring 26 and sleeve 31.

Gear 32 is continuously rotated by any suitable means and when arm 36 is disengaged from lug 35 spring 39 will move roller 28 into the narrower portion of the space between ring 26 and sleeve 31 and lock drum 25 to shaft 34, and when lug 35 again engages arm 36 roller 28 will be moved into the wider portion of the space between ring 26 and sleeve 31 and shaft 34 will come to rest. Shaft 34 is also provided with a correcting arm and disk corresponding to 23 and 24.

I claim:

1. In a clutch, a concentric member, and an eccentric member having a locking face forming a complete cylinder, means including a roller to lock said two members, and means whereby said roller engages different spots in both of said members when disengaged and again reëngaged.

2. In a clutch, a constantly rotating member having a circular rim concentric with its axis, a sleeve eccentric on the same axis and lying within said rim, a roller carrier rotatable on the same axis and having a part projecting into the space between said eccentric sleeve and said concentric ring, an opening in said projecting part, a roller carried in said opening, and a spring tending to rotate said carrier and move said roller into the narrower part of the space between the eccentric sleeve and the concentric rim.

3. In a clutch, a constantly rotating member having a circular rim concentric with its axis, a sleeve eccentric on the same axis and lying within said rim, a roller carrier rotatable on the same axis and having a part projecting into the space between said eccentric sleeve and said concentric ring, an opening in said projecting part, a roller carried in said opening, a spring tending to rotate said carrier and move said roller into the narrower part of the space between the eccentric sleeve and the concentric rim, a lug on said carrier and a pivoted arm adapted to engage said lug and uncouple said two members.

4. In a clutch, a constantly rotating member having a rim, an eccentric sleeve within said rim and mounted to rotate on the same axis, a ring movably mounted on said eccentric and a roller adapted to lock said constantly rotating member to said eccentric.

5. In a clutch, a constantly rotating member having a rim, an eccentric sleeve within said rim and mounted to rotate on the same axis, a ring movably mounted on said eccentric, means to produce friction between said sleeve and said ring, and a roller adapted to lock said constantly rotating member to said eccentric.

6. In a clutch, two members, means including a roller to lock said two members, means whereby said roller engages different spots on both of said members when disengaged and again reëngaged and a carrier adapted to move said roller to couple and uncouple said members.

7. In a clutch, an eccentric member, a concentric member, a roller adapted to lock said two members, and means coöperating with the eccentric member to present a different point to the roller at each successive engagement.

8. In a clutch, an eccentric member, a concentric member, a roller adapted to lock said two members, and a ring coöperating with the eccentric member to present a different point to the roller at each successive engagement.

In testimony whereof I affix my signature.

LOUIS M. POTTS.